United States Patent
Johnson et al.

(10) Patent No.: US 8,077,236 B2
(45) Date of Patent: Dec. 13, 2011

(54) METHOD AND APPARATUS PROVIDING REDUCED METAL ROUTING IN IMAGERS

(75) Inventors: Richard S. Johnson, Boise, ID (US); John Ladd, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 721 days.

(21) Appl. No.: 12/076,634

(22) Filed: Mar. 20, 2008

(65) Prior Publication Data
US 2009/0237541 A1   Sep. 24, 2009

(51) Int. Cl.
  *H04N 3/14* (2006.01)
  *H04N 5/335* (2011.01)
  *H01L 27/00* (2006.01)
  *H01L 31/062* (2006.01)
  *H01L 31/113* (2006.01)

(52) U.S. Cl. ............. 348/294; 250/208.1; 257/291; 257/292; 257/293

(58) Field of Classification Search ......... 348/241, 348/294–324; 250/208.1; 257/291–293
See application file for complete search history.

(56) References Cited

U.S. PATENT DOCUMENTS

| | | | |
|---|---|---|---|
| 6,218,656 B1 | 4/2001 | Guidash | |
| 6,423,994 B1 | 7/2002 | Guidash | |
| 6,697,114 B1 * | 2/2004 | Merrill | 348/308 |
| 6,777,660 B1 * | 8/2004 | Lee | 250/208.1 |
| 6,927,433 B2 | 8/2005 | Hynecek | |
| 6,977,684 B1 | 12/2005 | Hashimoto et al. | |
| 7,019,345 B2 * | 3/2006 | Pain et al. | 257/292 |
| 7,057,150 B2 | 6/2006 | Zarnowski et al. | |
| 7,271,462 B2 | 9/2007 | Satoru | |
| 7,414,233 B2 * | 8/2008 | Asaba | 250/208.1 |
| 7,755,679 B2 * | 7/2010 | Rossi et al. | 348/243 |
| 2004/0217262 A1 * | 11/2004 | Lee | 250/208.1 |
| 2004/0227832 A1 * | 11/2004 | Loose | 348/308 |
| 2005/0110093 A1 * | 5/2005 | Altice et al. | 257/359 |
| 2005/0128327 A1 | 6/2005 | Bencuya et al. | |
| 2005/0247941 A1 | 11/2005 | Adachi | |
| 2006/0044437 A1 * | 3/2006 | Shah | 348/308 |
| 2006/0108614 A1 * | 5/2006 | Yi et al. | 257/239 |
| 2006/0138489 A1 | 6/2006 | Ahn et al. | |
| 2006/0146156 A1 | 7/2006 | Toros et al. | |

(Continued)

FOREIGN PATENT DOCUMENTS

| | | |
|---|---|---|
| EP | 0 977 426 A1 | 2/2000 |
| JP | 2006-054276 | 2/2006 |
| JP | 2006-211653 | 8/2006 |
| KR | 2004-0033366 | 4/2004 |
| WO | WO 2007/108129 A1 | 9/2007 |

OTHER PUBLICATIONS

Hidekazu Takahashi, et al., "A 3.9-μm Pixel Pitch VGA Format 10-b Digital Output CMOS Image Sensor with 1.5 Transistor/Pixel," IEEE Journal of Solid State Circuits, vol. 39, No. 12, Dec. 2004, pp. 2417-2425.

Keiji Mabuchi, et al., "CMOS Image Sensors Comprised of Floating Diffusion Driving Pixels With Buried Photodiode," IEEE Journal of Solid State Circuits, vol. 39, No. 12, Dec. 2004, pp. 2408-2416.

(Continued)

*Primary Examiner* — Nhan T Tran
*Assistant Examiner* — Tuan Le

(57) ABSTRACT

An imaging device and method for operating the device. The imaging device comprises a pixel array having a plurality of pixels arranged in rows and columns. At least one pixel of the array comprises a photosensor and a first reset circuit responsive to a first reset control signal for resetting the photosensor. A first terminal of the first reset circuit is coupled to the photosensor and a second terminal of the first reset circuit is configured to receive a first resetting voltage from a control line.

8 Claims, 16 Drawing Sheets

U.S. PATENT DOCUMENTS

| | | | |
|---|---|---|---|
| 2006/0256221 A1* | 11/2006 | Mckee et al. | 348/308 |
| 2006/0261246 A1 | 11/2006 | Krymski | |
| 2006/0261431 A1 | 11/2006 | Kim et al. | |
| 2006/0267052 A1 | 11/2006 | McKee | |
| 2007/0018267 A1 | 1/2007 | Altice, Jr. et al. | |
| 2007/0029465 A1 | 2/2007 | Choi et al. | |
| 2007/0034939 A1 | 2/2007 | Lee et al. | |
| 2007/0040922 A1 | 2/2007 | McKee et al. | |
| 2007/0210239 A1 | 9/2007 | Lee et al. | |
| 2007/0235631 A1 | 10/2007 | Ladd | |
| 2007/0262237 A1 | 11/2007 | Mann | |
| 2008/0001067 A1 | 1/2008 | Asaba et al. | |
| 2008/0273105 A1* | 11/2008 | Tanaka et al. | 348/301 |
| 2008/0291310 A1* | 11/2008 | Ladd et al. | 348/308 |
| 2009/0237541 A1* | 9/2009 | Johnson et al. | 348/308 |

OTHER PUBLICATIONS

Hwang-Cherng Chow, et al., "New Pixel-Shared Design and Split-Path Readout of CMOS Image Sensor Circuits," IEEE International Symposium on Circuits and Systems, vol. 4, May 2002, pp. IV-49-IV-52.

Mitsuyoshi Mori, et al., "¼ inch 2-Mpixel MOS Image Sensor With 1.75 Transistors/Pixel," IEEE Journal of Solid State Circuits, vol. 39, No. 12, Dec. 2004, pp. 2426-2430.

Chang-Rok Moon, et al., "The features and characteristics of 5M CMOS image sensor with 1.9×1.9 $\mu m^2$ pixels," IEEE International Electron Devices Meeting, IEDM Technical Digest, Dec. 5-7, 2005, 4 pages.

* cited by examiner

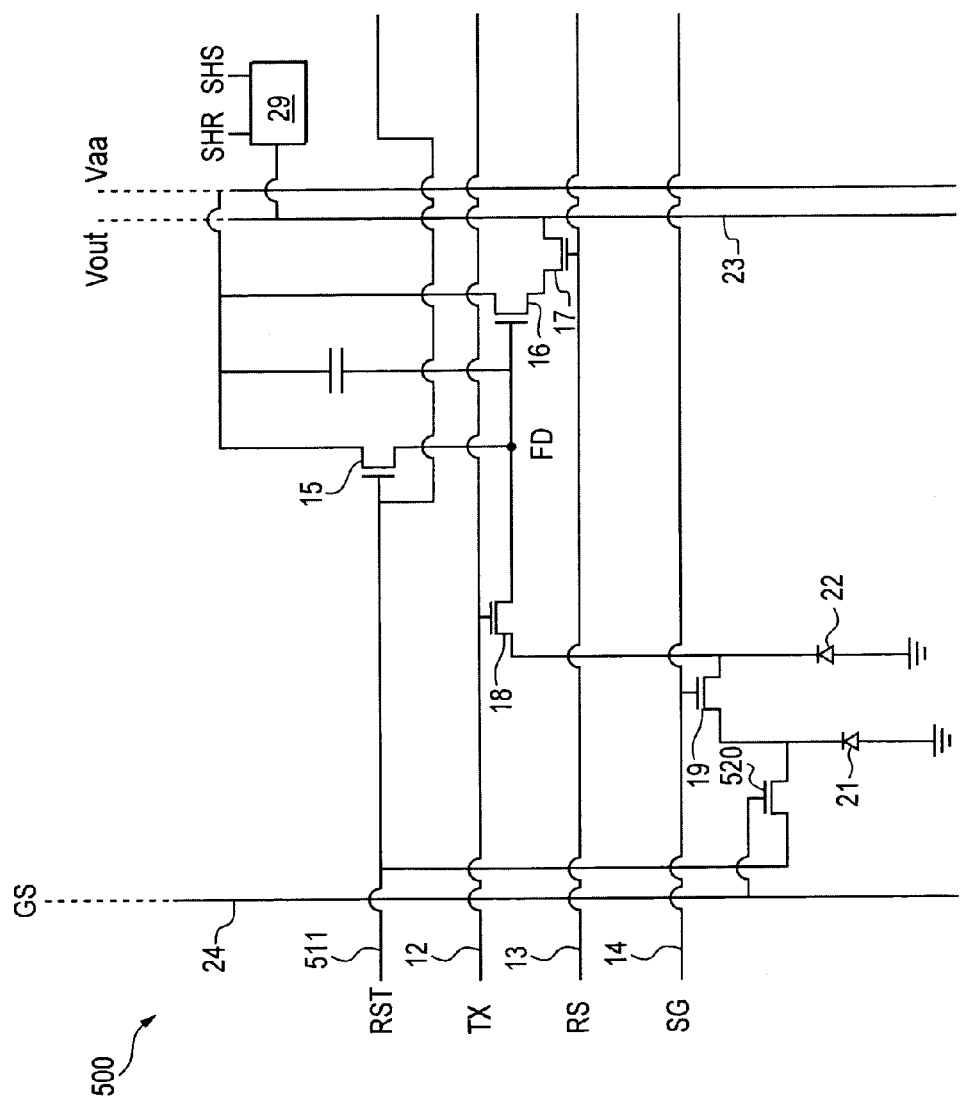

METHOD AND APPARATUS PROVIDING REDUCED METAL ROUTING IN IMAGERS

FIELD OF THE INVENTION

Embodiments described herein relate generally to imaging devices having pixel arrays with pixels containing global reset transistors.

BACKGROUND OF THE INVENTION

Many portable electronic devices, such as cameras, cellular telephones, Personal Digital Assistants (PDAs), MP3 players, computers, and other devices include an imaging device for capturing images. One example of an imaging device is a CMOS imager. A CMOS imager includes a focal plane array of pixels, each pixel including a photosensor, for example, a photodiode, overlying a substrate for producing a photo-generated charge in a doped region of the substrate. In a CMOS imager, the active elements of a pixel, for example a four transistor (4T) pixel, perform the functions of (1) photon to charge conversion; (2) transfer of charge to the floating diffusion region; (3) resetting the floating diffusion region to a known state; (4) selection of a pixel for readout; and (5) output and amplification of a signal representing a reset voltage and a pixel signal voltage based on the photo converted charges. The charge at the floating diffusion region is converted to a pixel or reset output voltage by a source follower output transistor.

Examples of CMOS imagers, processing steps thereof, and detailed descriptions of the functions of various elements of a CMOS imager are described, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, all assigned to Micron Technology, Inc.

Some imagers, however, allow for electronic shuttering. One technique for electronic shuttering is the use of a storage gate in the pixels. When a storage gate is implemented in a pixel design, a storage node is added such that charges accumulated in a photosensor are transferred through the storage gate to a storage node. An example of a pixel incorporating a storage gate is U.S. application Ser. No. 10/721,191, assigned to Micron Technology Inc.

In addition, some imagers include anti-blooming gates. Blooming is caused when too much light enters a pixel and the pixel becomes saturated and unable to hold all of the charge generated by the photosensor. Consequently, the excess photo-generated charge overflows the pixel and contaminates adjacent pixels with electrical crosstalk. The overflow charge from one pixel to the next can create a bright spot or streak in a resultant image, called blooming. Anti-blooming gates bleed off charge from a photosensor to avoid blooming crosstalk of adjacent pixels and the resultant error.

To provide an electronic shutter and alleviate blooming, a pixel has been developed containing an anti-blooming gate and a storage gate. A schematic diagram of such a pixel 10 is illustrated in FIG. 1A. The illustrated pixel 10 includes a photosensor 21 (e.g., photodiode) that is switchably coupled to a storage node 22 by a storage gate transistor 19. A global reset transistor 20 switchably couples the photosensor 21 to the array voltage Vaa. The storage node 22 is switchably coupled to a floating diffusion region FD by a transfer transistor 18. The floating diffusion region FD is further connected to a gate of a source follower transistor 16. A row select transistor 17 selectively couples the source follower transistor 16 to a column line 23. A reset transistor 15 switchably couples the array voltage Vaa to the floating diffusion region FD.

The pixel 10 also includes a global reset line 24 coupled to the gate of the global reset transistor 20 as well as to the gates of other global reset transistors in the respective pixels of an array. A storage gate control line 14 is coupled to the gate of the storage gate transistor 19 as well as to the gates of other storage gate transistors in the respective pixels of an array. A row select line 13 is coupled to the gate of the row select transistor 17. A transfer control line 12 is coupled to the gate of the transfer transistor 18. A reset control line 11 is coupled to the gate of the reset transistor 15. The global reset line 24 carries a global reset control signal GR, storage gate control line 14 carries a storage gate control signal SG, row select line 13 carries a row select signal RS, transfer control line 12 carries a transfer control signal TX and reset control line 11 carries a reset control signal RST.

FIG. 1B shows one possible method of operating the FIG. 1A pixel 10. A global transfer operation is performed on a pixel 10 that has been integrating charge at the photosensor 21. During the global transfer operation, the storage gate control signal SG is activated, transferring the charge accumulated by the photosensor 21 to the storage node 22. A global shutter operation is performed during which the global reset control signal GR is activated, allowing the global reset transistor 20 to reset the photosensor 21 for a next integration period. When the global reset signal GR is inactivated at the end of the global shutter operation, the photosensor 21 begins integration of a new charge that will be processed according to the method of FIG. 1B during the next global transfer operation.

While the photosensor 21 integrates charge for future processing, a pixel array rolling readout operation is performed of the charge already transferred to the storage node 22. The first step in reading out the pixel 10 is activating the row select signal RS. Next, the reset control signal RST is activated to reset the floating diffusion region FD. The reset charge at the floating diffusion region FD is read by the source follower transistor 16. A pixel reset signal $V_{rst}$ is output by the source follower transistor 16 through row select transistor 17 to column line 23, which routes the signal to sample and hold circuit 29, which samples and holds the pixel reset signal $V_{rst}$ when the reset sample and hold select signal SHR is activated. Next, the transfer control signal TX is activated transferring the integrated charge from the storage node 22 to the floating diffusion region FD. This charge is output as the photo signal $V_{sig}$ from the output of the source follower transistor 16 through row select transistor 17 to column line 23. Column line 23 routes the signal to the sample and hold circuit 29, which samples and holds the photo signal $V_{sig}$ when the pixel signal sample and hold select signal SHS is activated.

Optionally, the global reset signal GR maintains a low positive voltage when inactive, shown by dashed line 51, allowing photosensor 21 to bleed excess charge to the array voltage Vaa to provide an anti-blooming capability. To allow charge bleeding by the photosensor 21, the low positive voltage 51 must be higher than the voltage of the photosensor 21.

With additional lines and transistors, pixels with anti-blooming and/or storage gate transistors require additional metal routing that interferes with an optical path to the photosensor and, therefore, suffer from decreased fill factor and quantum efficiency. Accordingly, there is a desire for a pixel having anti-blooming and/or storage gate functionality with improved fill factor and quantum efficiency.

BRIEF DESCRIPTION OF THE DRAWINGS

FIG. 6A is a diagram of a pixel according to an embodiment described herein.

DETAILED DESCRIPTION OF THE INVENTION

In the following detailed description, reference is made to various embodiments of the invention that are described with sufficient detail to enable those skilled in the art to practice them. It is to be understood that other embodiments may be employed, and that various structural, logical and electrical changes may be made. The progression of processing steps described is an example of embodiments of the invention; however, the sequence of steps is not limited to that set forth herein and may be changed as is known in the art, with the exception of steps necessarily occurring in a certain order.

Various embodiments described herein provide reduced metal routing in an imager by combining metal routing lines within a pixel and neighboring pixels. By combining lines to carry signals to and from more than one circuit, metal lines are reduced; thus, allowing for more area for the photosensor and its associated optical path, and an increase in quantum efficiency.

The term "pixel," as used herein, refers to a photo-element unit cell containing at least a photosensor for converting photons to an electrical signal. For purposes of illustration, a small number of representative pixels are illustrated in the figures and description herein; however, typically fabrication of a large plurality of like pixels for an array proceeds simultaneously. Accordingly, the following detailed description is not to be taken in a limiting sense. While not shown in this application, embodiments described herein should be understood to include shared pixel architectures. One example of shared lines in shared pixel architectures is described in U.S. patent application Ser. No. 12/004,033, filed Dec. 20, 2007, and assigned to Micron Technology Inc.

Figure 1A:
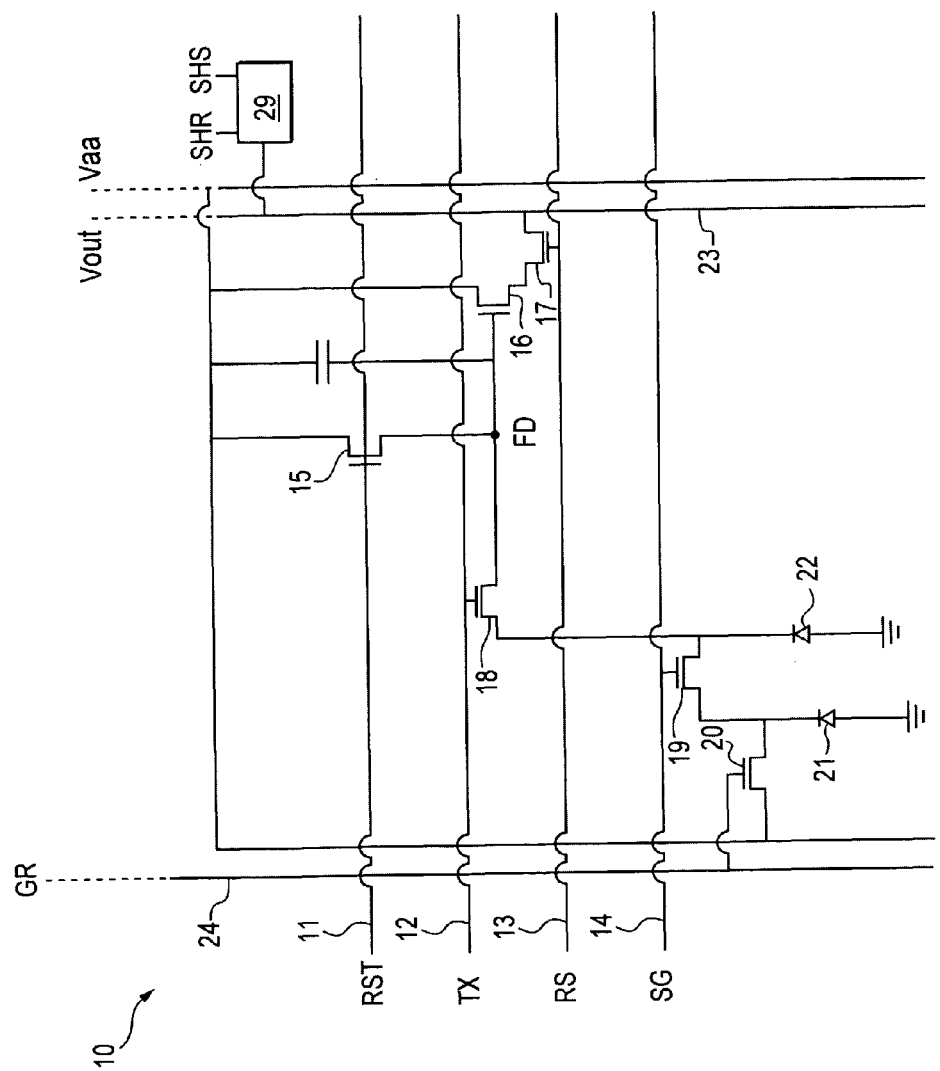
FIG. 1A illustrates a prior art pixel for use in an array of an imaging device.
Figure 2A:
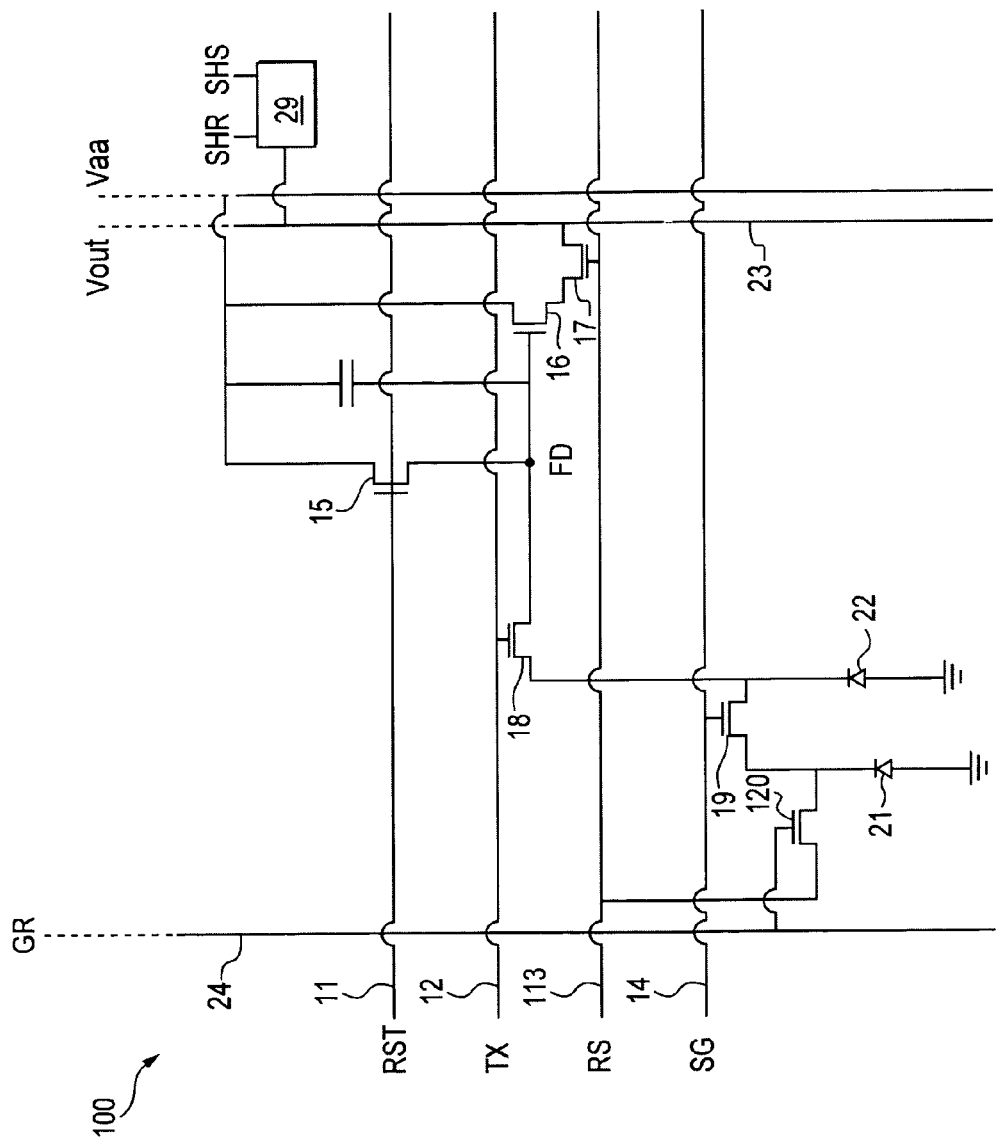
FIG. 2A is a diagram of a pixel according to an embodiment described herein.

Now referring to the figures, where like reference numbers designate like elements, FIG. 2A illustrates an example of a pixel 100 in accordance with a first embodiment. Pixel 100 differs from pixel 10 in FIG. 1A in that pixel 100 has a first terminal of a global reset transistor 120 coupled to a row select line 113 instead of the array voltage Vaa (FIG. 1A), the significance of which is described below.

Pixel 100 (FIG. 2A) includes a photosensor 21 (e.g., photodiode) that is switchably coupled to a storage node 22 by a storage gate transistor 19. As mentioned above, the global reset transistor 120 switchably couples the photosensor 21 to a row select line 113. The storage node 22 is switchably coupled to a floating diffusion region FD by a transfer transistor 18. The floating diffusion region FD is further connected to a gate of a source follower transistor 16. A row select transistor 17 selectively couples the source follower transistor 16 to a column line 23. A reset transistor 15 switchably couples the array voltage Vaa to the floating diffusion region FD.

The pixel 100 also includes a global reset line 24 coupled to the gate of the global reset transistor 120 as well as to the gates of other global reset transistors in the respective pixels of an array. A storage gate control line 14 is coupled to the gate of the storage gate transistor 19 as well as to the gates of other storage gate transistors in the respective pixels of an array. A row select line 113 is coupled to the gate of the row select transistor 17. A transfer control line 12 is coupled to the gate of the transfer transistor 18. A reset control line 11 is coupled to the gate of the reset transistor 15. The global reset line 24 carries a global reset control signal GR, storage gate control line 14 carries storage gate control signal SG, row select line 113 carries row select signal RS, transfer control line 12 carries transfer control signal TX and reset control line 11 carries reset control signal RST.

While FIG. 2A shows a six transistor (6T) pixel 100, in an alternate embodiment, the storage gate transistor 19 and storage node 22 are not included; thus, a five transistor (5T) pixel can also implement the illustrated embodiment.

Figure 1B:
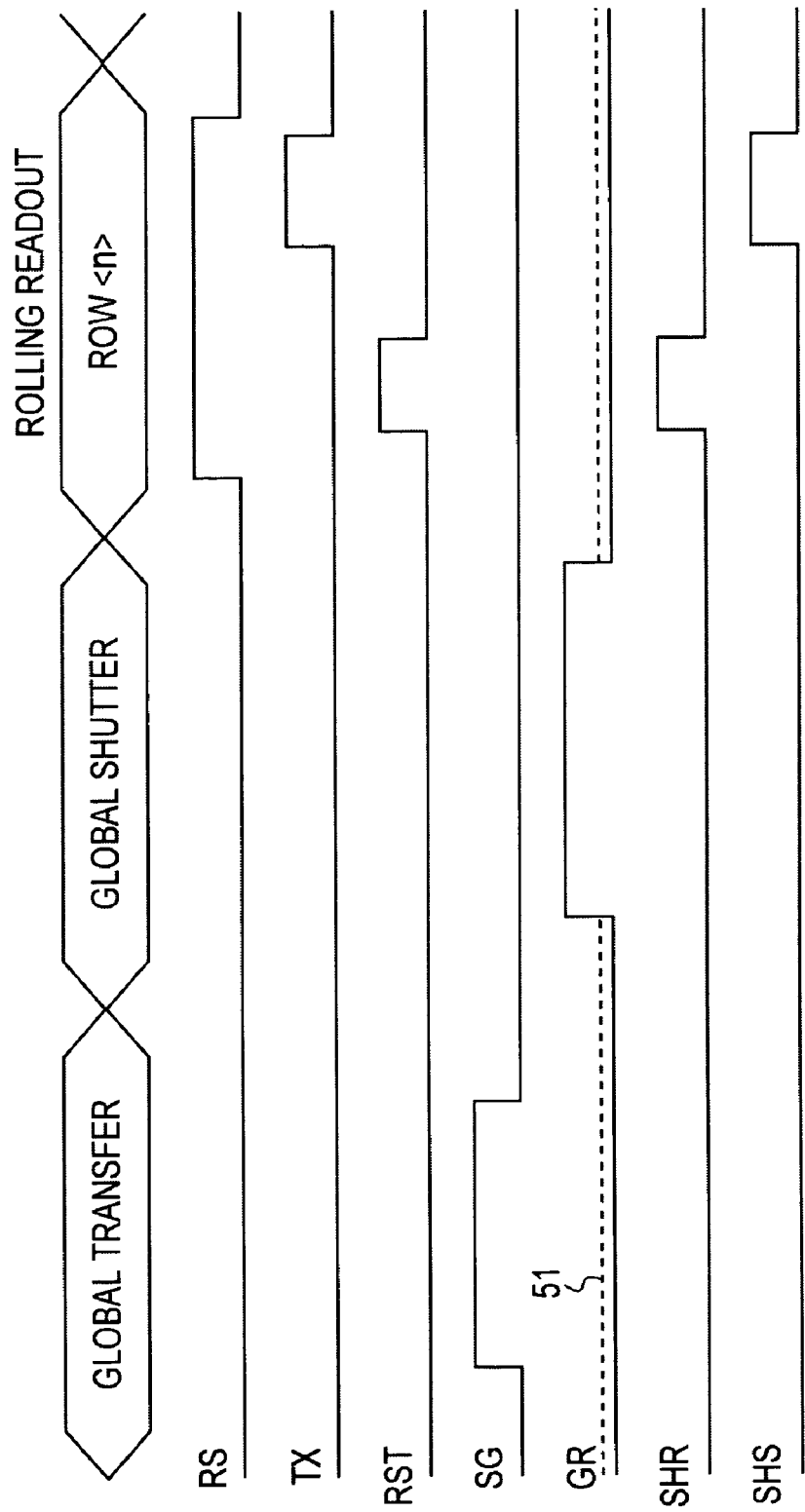
FIG. 1B is a timing diagram depicting an example of a method for operating a prior art pixel.
Figure 2B:
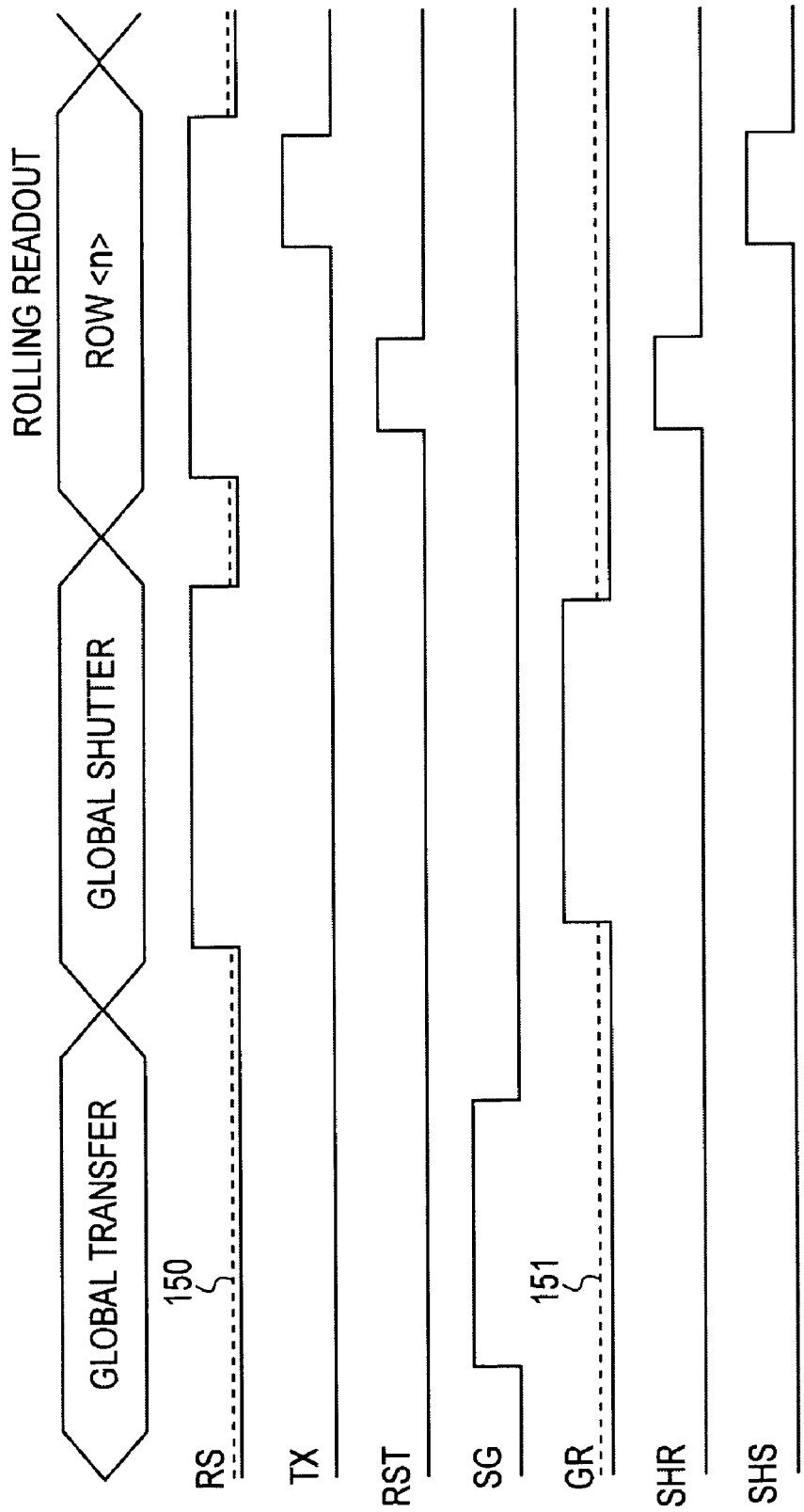
FIG. 2B is a timing diagram depicting an example of a method for operating a pixel constructed according to an embodiment described herein.

FIG. 2B shows one possible timing diagram for the operation of the FIG. 2A pixel 100. The timing diagram in FIG. 2B differs from the timing diagram in FIG. 1B in that the row select signal RS must also be activated during the global shutter operation because the global reset transistor 120 has a first terminal coupled to the row select line 113.

Referring to FIG. 2B, a global transfer operation is performed on a pixel 100 that has been integrating charge at the photosensor 21. During the global transfer operation, the storage gate control signal SG is activated, transferring the charge accumulated by the photosensor 21 to the storage node 22. A global shutter operation is performed during which the global reset control signal GR and row select signal RS are activated allowing the global reset transistor 120 to transfer the row select signal RS to the photosensor 21 to reset the photosensor 21 for a next integration period. When the global reset signal GR is inactivated at the end of the global shutter operation, the photosensor 21 begins integration of a new charge that will be processed according to the method of FIG. 2B during the next global transfer operation.

While the photosensor 21 integrates charge for future processing, a pixel array rolling readout operation is performed of the charge already transferred to the storage node 22. The first step in reading out the pixel 100 is activating the row select signal RS. Next, the reset control signal RST is activated to transfer a charge through the reset transistor 15 to the floating diffusion region FD and then to the source follower transistor 16. A pixel reset signal $V_{rst}$ is output by the source follower transistor 16 through row select transistor 17 to column line 23, which routes the signal to sample and hold circuit 29, which samples and holds the pixel reset signal $V_{rst}$ when the reset sample and hold select signal SHR is activated. Next, the transfer control signal TX is activated transferring the integrated charge from the storage node 22 to the floating diffusion region FD. This charge is output as the photo signal $V_{sig}$ from the output of the source follower transistor 16 through row select transistor 17 to column line 23. Column line 23 routes the signal to the sample and hold circuit 29, which samples and holds the photo signal $V_{sig}$ when the pixel signal sample and hold select signal SHS is activated.

In a modified embodiment, the row select signal RS and global reset signal GR maintain a low positive voltage when inactive, shown by dashed lines 150, 151. By maintaining at least some positive voltage on the row select line 113 and global reset control line 24, photosensor 21 is always able to bleed excess charge to the row select line 113 to provide an anti-blooming capability. The row select signal RS and global reset signal GR maintain a minimum positive voltage higher than that of the photosensor 21.

Figure 3A:
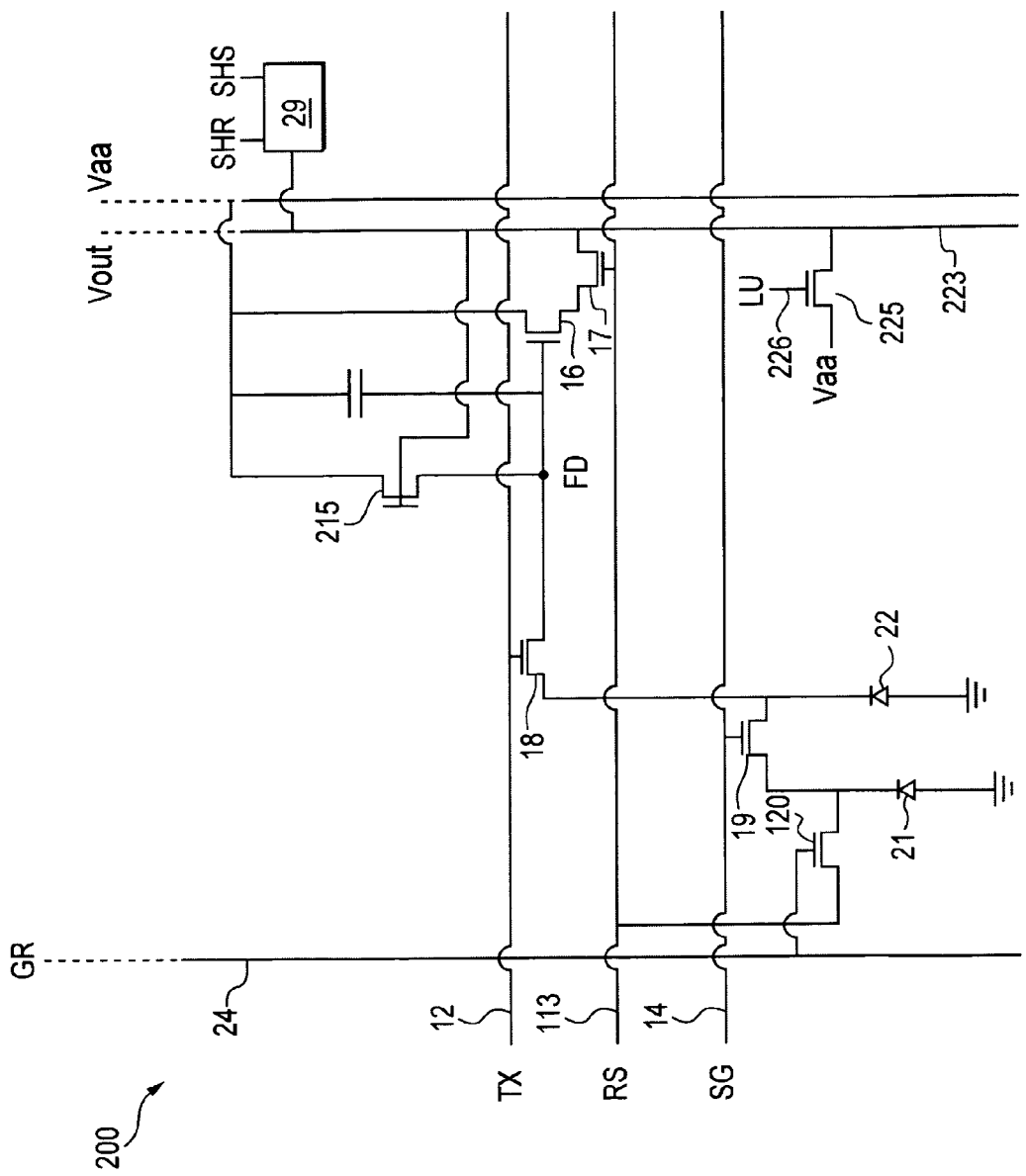
FIG. 3A is a diagram of a pixel according to an embodiment described herein.

FIG. 3A illustrates an example of a pixel 200 in accordance with a second embodiment. Pixel 200 differs from pixel 100 (FIG. 2A) in that pixel 200 has a gate of a reset transistor 215 coupled to the column line 223 that receives the pixel output signals $V_{rst}$, $V_{sig}$. Furthermore, pixel 200 has a latch up transistor 225, which has a gate coupled to a latch up control line 226, a first terminal coupled to the array voltage Vaa and a second terminal coupled to the column line 223. Because the latch up transistor 225, controlled by the latch up control signal LU, switchably couples the array voltage Vaa to the column line 223, and the gate of the reset transistor 215 is coupled to the column line 223, the latch up control signal LU controls the gate of reset transistor 215. The global reset transistor 120 has a first terminal coupled to the row select line 113, eliminating the need for a metal line to supply the array voltage Vaa to the first terminal of the global reset transistor 120. The gate of the reset transistor 215 is coupled to the column line 223, thus eliminating the reset control line 11 (FIGS. 1, 2).

While FIG. 3A shows a six transistor (6T) pixel 200, in an alternate embodiment, the storage gate transistor 19 and storage node 22 are not included; thus, a five transistor (5T) pixel can also implement the illustrated embodiment.

Figure 3B:
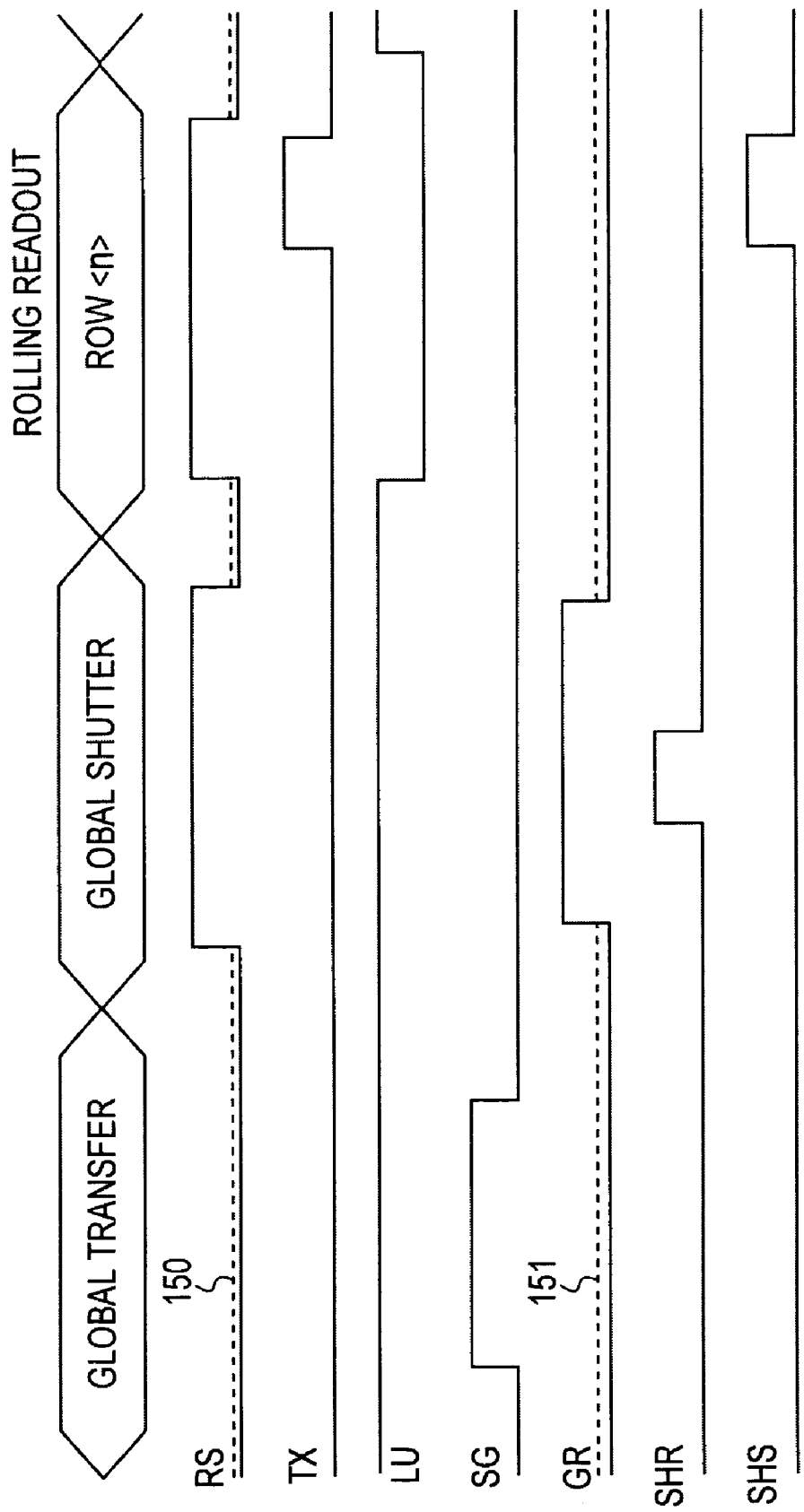
FIG. 3B is a timing diagram depicting an example of a method for operating a pixel constructed according to an embodiment described herein.

FIG. 3B shows one possible timing diagram for the operation of a FIG. 3A pixel 200. The timing in FIG. 3B differs from the timing in FIG. 2B in that the pixel reset signal $V_{rst}$ is sent to reset sample and hold circuit 29 during the global shutter operation when the reset sample and hold select signal SHR is activated and therefore need not be done during the rolling readout operation. Also, the timing in FIG. 3B includes the latch up control signal LU for activating the reset transistor 215, and does not include the reset control signal RST illustrated in FIG. 2B.

Referring to FIG. 3B, a global transfer operation is performed on the pixel 200 that has been integrating charge at the photosensor 21. During the global transfer operation, the storage gate control signal SG and latch up control signal LU are activated. Activating storage gate control signal SG transfers the charge accumulated by the photosensor 21 to the storage node 22 and activating the latch up control signal LU places a voltage on the column line 223. A global shutter operation is performed during which the global reset control signal GR and row select signal RS are activated allowing the global reset transistor 120 to transfer the row select signal RS to the photosensor 21 to reset the photosensor 21 for a next integration period. In addition, because the latch up control signal LU remains activated during the global shutter operation, a reset voltage is transferred through the reset transistor 215, through the floating diffusion region FD, out to the column line as a pixel reset signal $V_{rst}$, and stored in the sample and hold circuit 29 when the reset sample and hold select signal SHR is activated. When the global reset signal GR is inactivated at the end of the global shutter operation, the photosensor 21 begins integration of a new charge that will be processed according to the method of FIG. 3B during the next global transfer operation.

While the photosensor 21 integrates charge for future processing, a pixel array rolling readout operation is performed of the charge already transferred to the storage node 22. Because the pixel reset voltage $V_{rst}$ was stored during the global shutter operation, only the photo signal $V_{sig}$ needs to be read out during the rolling readout operation. The first step in reading out the pixel 200 is activating the transfer control signal TX thereby transferring the integrated charge from the storage node 22 to the floating diffusion region FD. This charge is output as the photo signal $V_{sig}$ from the output of the source follower transistor 16 through row select transistor 17 to column line 223. Column line 223 routes the signal to the sample and hold circuit 29, which samples and holds the photo signal $V_{sig}$ when the pixel signal sample and hold select signal SHS is activated.

In a modified embodiment, the row select signal RS and global reset signal GR maintain a low positive voltage when inactive, shown by dashed lines 150, 151. By maintaining at least some positive voltage on the row select line 113 and global reset control line 24, photosensor 21 is always able to bleed excess charge to the row select line 113 to provide an anti-blooming capability. The row select signal RS and global reset signal GR maintain a minimum positive voltage higher than that of the photosensor 21.

While FIG. 3B shows the latch up control signal LU activated during the global transfer operation to reduce blooming by keeping the floating diffusion region FD at a high potential, the latch up control signal can also be inactivated during the global transfer operation to help reduce dark current.

Figure 4A:
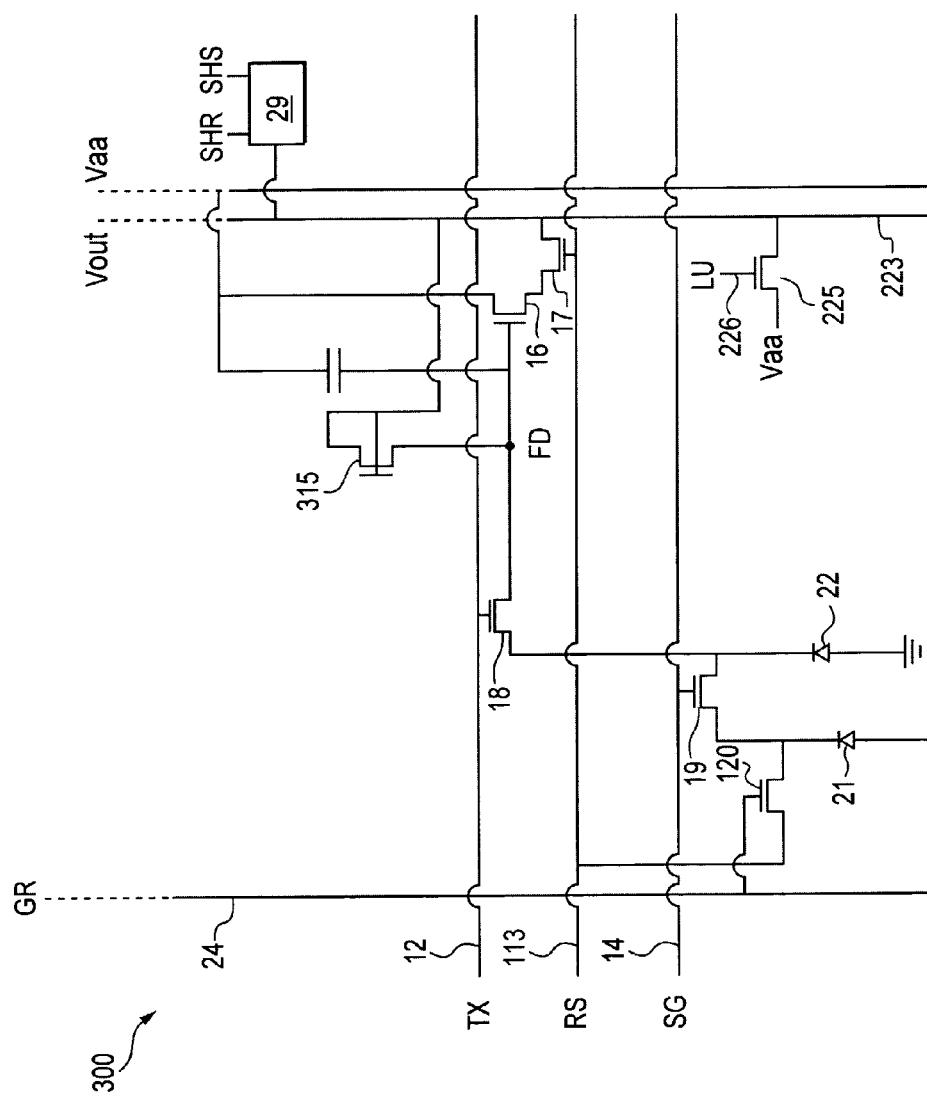
FIG. 4A is a diagram of a pixel according to an embodiment described herein.

FIG. 4A illustrates an example of a pixel 300 in accordance with a third embodiment. Pixel 300 differs from pixel 200 (FIG. 3A) in that the gate and first terminal of a reset transistor 315 are both coupled to the column line 223 using a single, combined line for activation and passing a voltage to the floating diffusion region FD. As a result, pixel 300 has a first terminal of the reset transistor 315 coupled to the column line 223 instead of being connected to the array voltage Vaa as in pixel 200 (FIG. 3A). The global reset transistor 120 couples a first terminal to the row select line 113, eliminating the need for a metal line to supply the array voltage Vaa to the first terminal of the global reset transistor 120. Both the first terminal and gate of the reset transistor 315 are coupled to the column line 223.

While FIG. 4A shows a six transistor (6T) pixel 300, in an alternate embodiment, the storage gate transistor 19 and storage node 22 are not included; thus, a five transistor (5T) pixel can also implement the illustrated embodiment.

Figure 4B:
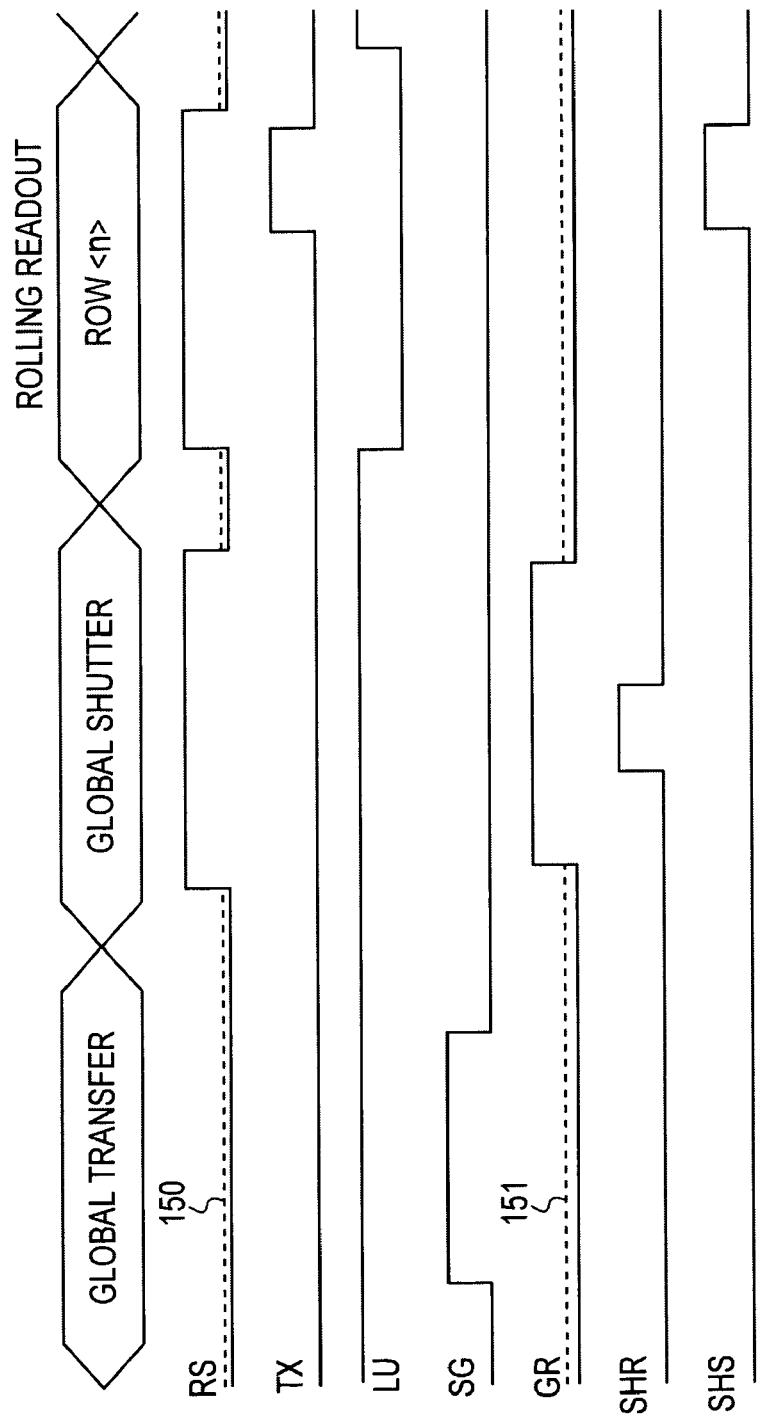
FIG. 4B is a timing diagram depicting an example of a method for operating a pixel constructed according to an embodiment described herein.

FIG. 4B shows one possible timing diagram for the operation of a FIG. 4A pixel 300. The timing in FIG. 4B is essentially the same as the timing in FIG. 3B for pixel 200. A global transfer operation is performed on the pixel 300 that has been integrating charge at the photosensor 21. During the global transfer operation, the storage gate control signal SG and a latch up control signal LU are activated. Activating storage gate control signal SG transfers the charge accumulated by the photosensor 21 to the storage node 22 and activating the latch up control signal LU places a voltage on the column line 223. A global shutter operation is performed during which the global reset control signal GR and row select signal RS are activated allowing the global reset transistor 120 to transfer the row select signal RS to the photosensor 21 to reset the photosensor 21 for a next integration period. In addition, because the latch up control signal LU remains activated during the global shutter operation, a reset voltage is transferred through the reset transistor 315, through the floating diffusion region FD, out to the column line as a pixel reset signal $V_{rst}$, and stored in the sample and hold circuit 29 when the reset sample and hold select signal SHR is activated. When the global reset signal GR is inactivated at the end of the global shutter operation, the photosensor 21 begins integration of a new charge that will be processed according to the method of FIG. 4B during the next global transfer operation.

While the photosensor 21 integrates charge for future processing, a pixel array rolling readout operation is performed of the charge already transferred to the storage node 22. Because the pixel reset voltage $V_{rst}$ was stored during the global shutter operation, only the photo signal $V_{sig}$ needs to be read out during the rolling readout operation. The first step in reading out the pixel 200 is activating the transfer control signal TX thereby transferring the integrated charge from the storage node 22 to the floating diffusion region FD. This charge is output as the photo signal $V_{sig}$ from the output of the source follower transistor 16 through row select transistor 17 to column line 223. Column line 223 routes the signal to the sample and hold circuit 29, which samples and holds the photo signal $V_{sig}$ when the pixel signal sample and hold select signal SHS is activated.

In a modified embodiment, the row select signal RS and global reset signal GR maintain a low positive voltage when deactivated, shown by dashed lines 150, 151. By maintaining at least some positive voltage on the row select line 113 and global reset control line 24, photosensor 21 is always able to bleed excess charge to the row select line 113 to provide an anti-blooming capability. The row select signal RS and global reset signal GR maintain a minimum positive voltage higher than that of the photosensor 21.

While FIG. 4B shows the latch up control signal LU activated during the global transfer operation to reduce blooming by keeping the floating diffusion region FD at a high potential, the latch up control signal can also be inactivated during the global transfer operation to help reduce dark current.

Figure 5A:
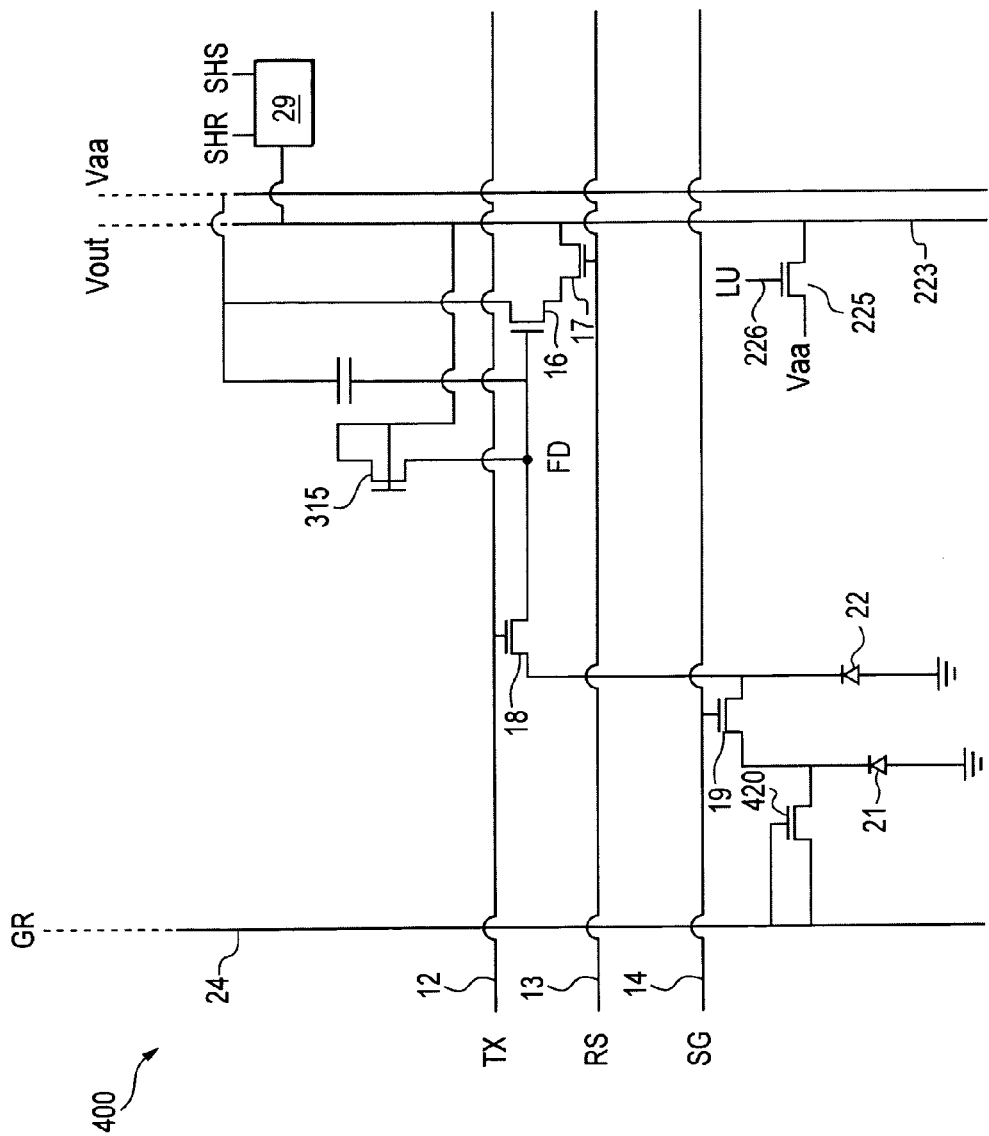
FIG. 5A is a diagram of a pixel according to an embodiment described herein.

FIG. 5A illustrates an example of a pixel 400 in accordance with a fourth embodiment. Pixel 400 differs from pixel 300 (FIG. 4A) in that pixel 400 has a first terminal of a global reset transistor 420 coupled to the global reset control line 24. Both the first terminal and gate of the reset transistor 315 are coupled to the column line, and therefore share a single line. A metal line is not needed to couple the first terminal of the global reset transistor 420 to the array voltage Vaa.

While FIG. 5A shows a six transistor (6T) pixel 300, in an alternate embodiment, the storage gate transistor 19 and storage node 22 are not included; thus, a five transistor (5T) pixel can also implement the illustrated embodiment.

Figure 5B:
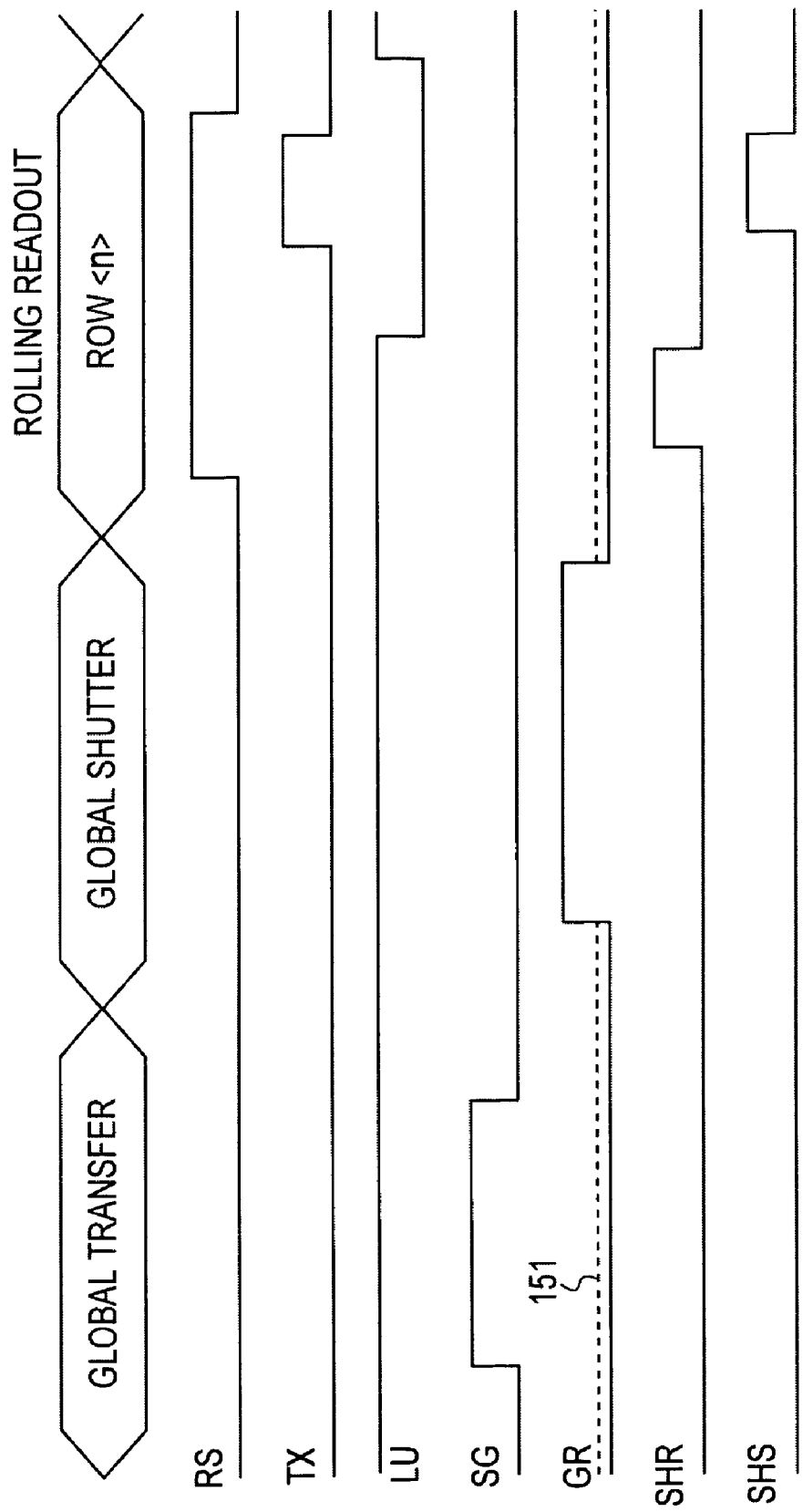
FIG. 5B is a timing diagram depicting an example of a method for operating a pixel constructed according to an embodiment described herein.

FIG. 5B shows one possible timing diagram for the operation of a FIG. 5A pixel 400. The timing in FIG. 5B for pixel 400 differs from the timing in FIG. 4B for pixel 300 in that only the global reset control signal GR is activated during the global shutter operation because both the gate and first terminal of the global reset transistor 420 are coupled to the global reset control line 24. In addition, the pixel reset signal $V_{rst}$ is sampled during the rolling readout operation in pixel 400, not during the global shutter operation as in pixel 300, because the row select signal RS is not activated during the global shutter operation.

Referring now to FIG. 5B, a global transfer operation is performed on the pixel 400 that has been integrating charge at the photosensor 21. During the global transfer operation, storage gate control signal SG and a latch up control signal LU are activated. Activating storage gate control signal SG transfers the charge accumulated by the photosensor 21 to the storage node 22 and activating the latch up control signal LU places a voltage on the column line 223. A global shutter operation is performed during which the global reset control signal GR is activated, allowing the global reset transistor 420 to transfer the global reset control signal GR to the photosensor 21 to reset the photosensor 21 for a next integration period. When the global reset signal GR is inactivated at the end of the global shutter operation, the photosensor 21 begins integration of a new charge that will be processed according to the method of FIG. 5B during the next global transfer operation.

While the photosensor 21 integrates charge for future processing, a pixel array rolling readout operation is performed of the charge already transferred to the storage node 22. The first step in reading out the pixel 400 is activating the row select signal RS. Because the latch up control signal LU remains activated, a charge is transferred from the reset transistor 15 to the floating diffusion region FD and then to the source follower transistor 16. A pixel reset signal $V_{rst}$ is output by the source follower transistor 16 through row select transistor 17 to column line 223 which routes the signal to sample and hold circuit 29, which samples and holds the pixel reset signal $V_{rst}$ when the reset sample and hold select signal SHR is activated. Next, the transfer control signal TX is activated thereby transferring the integrated charge from the storage node 22 to the floating diffusion region FD. This charge is output as the photo signal $V_{sig}$ from the output of the source follower transistor 16 through row select transistor 17 to column line 223. Column line 223 routes the signal to the sample and hold circuit 29, which samples and holds the photo signal $V_{sig}$ when the pixel signal sample and hold select signal SHS is activated.

In a modified embodiment, the global reset signal GR maintains a low positive voltage when inactive, shown by dashed line 151. By maintaining at least some positive voltage on the global reset control line 24, photosensor 21 is always able to bleed excess charge to the row select line 13 to provide an anti-blooming capability. The global reset signal GR maintains a minimum positive voltage higher than that of the photosensor 21.

While FIG. 5B shows the latch up control signal LU activated during the global transfer operation to reduce blooming by keeping the floating diffusion region FD at a high potential, the latch up control signal can also be inactivated during the global transfer operation to help reduce dark current.

FIG. 6A illustrates an example of a pixel 500 in accordance with a fifth embodiment. Pixel 500 differs from pixel 100 (FIG. 2A) in that pixel 500 has a first terminal of a global reset transistor 520 coupled to a reset control line 511 instead of being coupled to the array voltage Vaa (FIG. 1). A metal line is not needed to couple the first terminal of the global reset transistor 520 to the array voltage Vaa.

While FIG. 6A shows a six transistor (6T) pixel 500, in an alternate embodiment, the storage gate transistor 19 and storage node 22 are not included; thus, a five transistor (5T) pixel can also implement the illustrated embodiment.

Figure 6B:
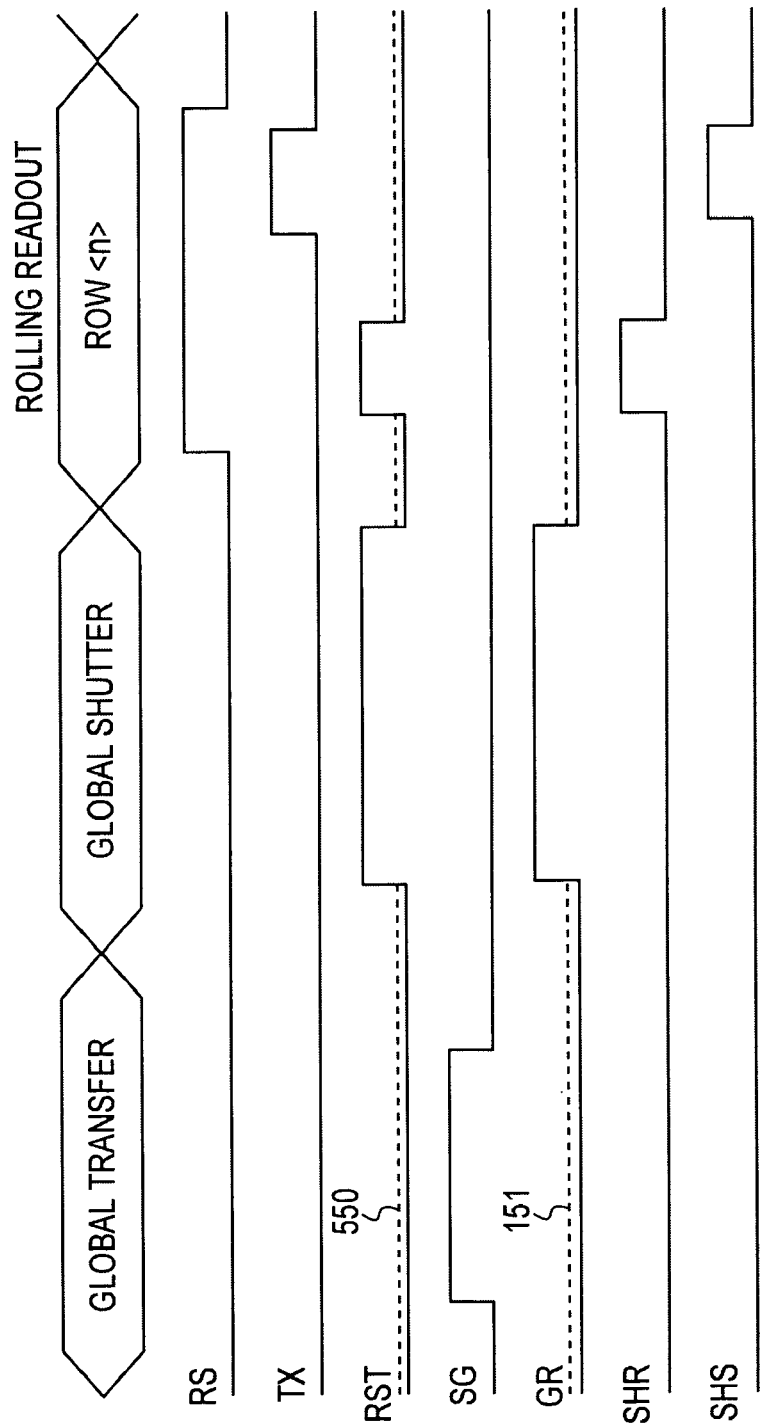
FIG. 6B is a timing diagram depicting an example of a method for operating a pixel constructed according to an embodiment described herein.

FIG. 6B shows one possible timing diagram for the operation of a FIG. 6A pixel 500. The timing in FIG. 6B for pixel 500 differs from the timing in FIG. 2B for pixel 100 in that the reset control signal RST, not the row select signal RS, is activated during the global shutter operation.

Referring to FIG. 6B, a global transfer operation is performed on the pixel 500 that has been integrating charge at the photosensor 21. During the global transfer operation, the storage gate control signal SG is activated, transferring the charge accumulated by the photosensor 21 to the storage node 22. A global shutter operation is performed during which the global reset control signal GR and reset control signal RST are activated allowing the global reset transistor 520 to transfer the reset control signal RST to the photosensor 21 to reset the photosensor 21 for a next integration period. When the global reset signal GR is inactivated at the end of the global shutter operation, the photosensor 21 begins integration of a new charge that will be processed according to the method of FIG. 6B during the next global transfer operation.

While the photosensor 21 integrates charge for future processing, a pixel array rolling readout operation is performed of the charge already transferred to the storage node 22. The first step in reading out the pixel 500 is activating the row select signal RS. Next, the reset control signal RST is activated to transfer a charge through the reset transistor 15 to the floating diffusion region FD and then to the source follower transistor 16. A pixel reset signal $V_{rst}$ is output by the source follower transistor 16 through row select transistor 17 to column line 23, which routes the signal to sample and hold circuit 29, which samples and holds the pixel reset signal $V_{rst}$ when the reset sample and hold select signal SHR is activated. Next, the transfer control signal TX is activated transferring the integrated charge from the storage node 22 to the floating diffusion region FD. This charge is output as the photo signal $V_{sig}$ from the output of the source follower transistor 16 through row select transistor 17 to column line 23. Column line 23 routes the signal to the sample and hold circuit 29, which samples and holds the photo signal $V_{sig}$ when the pixel signal sample and hold select signal SHS is activated.

In a modified embodiment, the reset control signal RST and global reset signal GR maintain a low positive voltage when inactive, shown by dashed lines 550, 151. By maintaining at least some positive voltage on the reset control line 511 and global reset control line 24, photosensor 21 is always able to bleed excess charge to the reset control line 511 to provide an anti-blooming capability. The reset control signal RST and global reset signal GR maintain a minimum positive voltage higher than that of the photosensor 21.

Figure 7A:
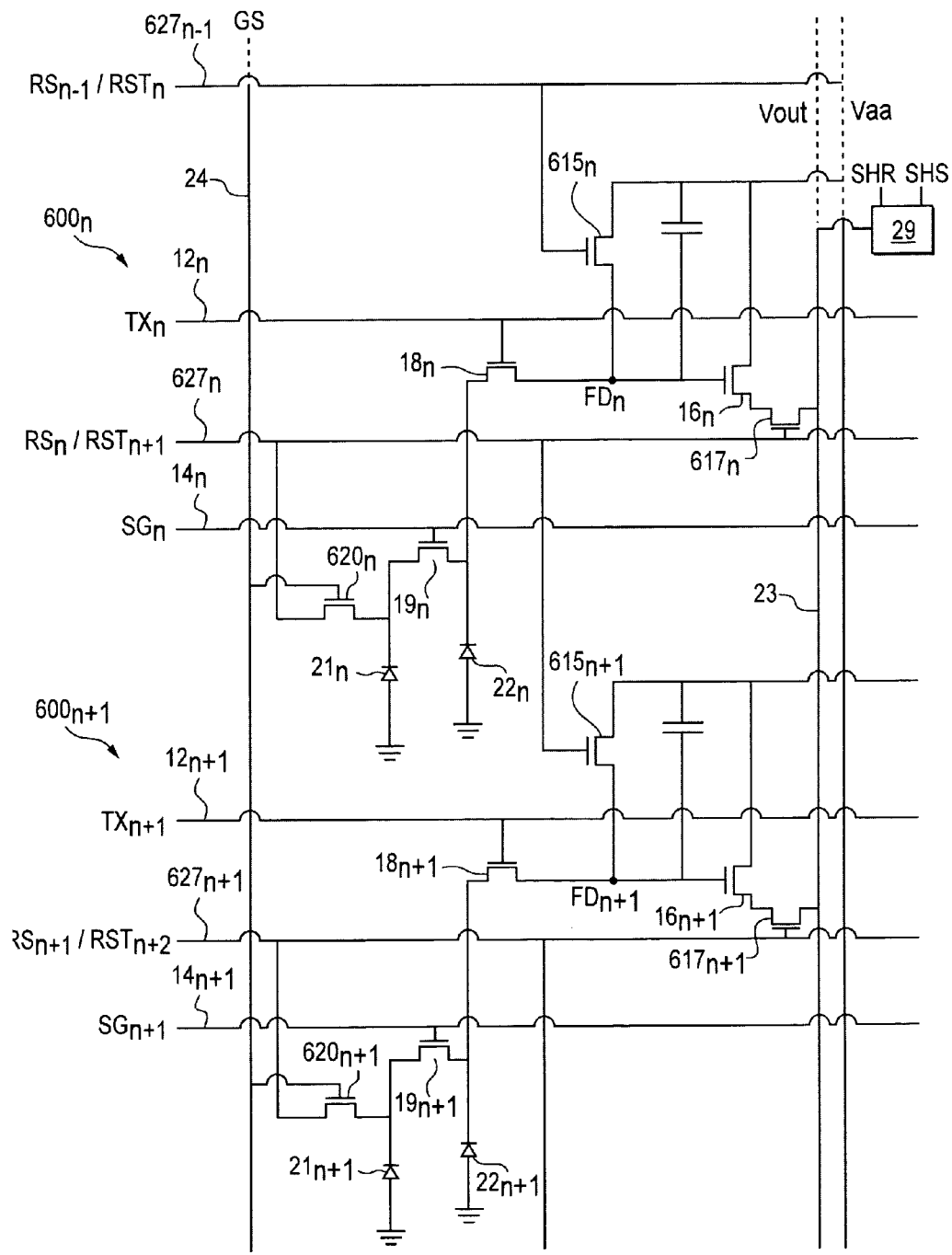
FIG. 7A is a diagram of a portion of a pixel array according to an embodiment described herein.

FIG. 7A illustrates a portion of a pixel array containing vertically adjacent pixels $600_n$, $600_{n+1}$ in accordance with a sixth embodiment, where n is the current row in the pixel array and n+1 is the next row in the pixel array. For clarity, only pixel $600_n$ will be described because the components of the pixels $600_n$, $600_{n+1}$ are identical.

Pixel $600_n$ has a row/reset control line $627_n$ that is coupled to the gate of the row select transistor $617_n$ of pixel $600_n$ in the current row, the gate of the reset transistor $615_{n+1}$ in a vertically adjacent pixel $600_{n+1}$ and a first terminal of the global reset transistor $620_n$ of pixel $600_n$. The row/reset control line $627_n$ carries the row select signal RS for pixel $600_n$ and the reset control signal RST for a vertically adjacent pixel $600_{n+1}$. The row/reset control line $627_n$ also supplies the voltage to reset the photosensor $621_n$ (via global reset transistor $620_n$). The row select and reset control lines are shared between adjacent pixels, thus eliminating one metal line from each row of the pixel array. The global reset transistor $620_n$ shares the row/reset control line $627_n$ as well.

While FIG. 7A shows a six transistor (6T) pixel $600_n$, in an alternate embodiment, the storage gate transistor $19_n$ and storage node $22_n$ are not included; thus, a five transistor (5T) pixel can also implement the illustrated embodiment. Furthermore, while FIG. 7A shows row/reset control line $627_n$ coupled to a reset transistor $615_{n+1}$ in a following row, in an alternate embodiment row/reset control line $627_n$ is coupled to a reset transistor $615_{n-1}$ in a previous row.

Figure 7B:
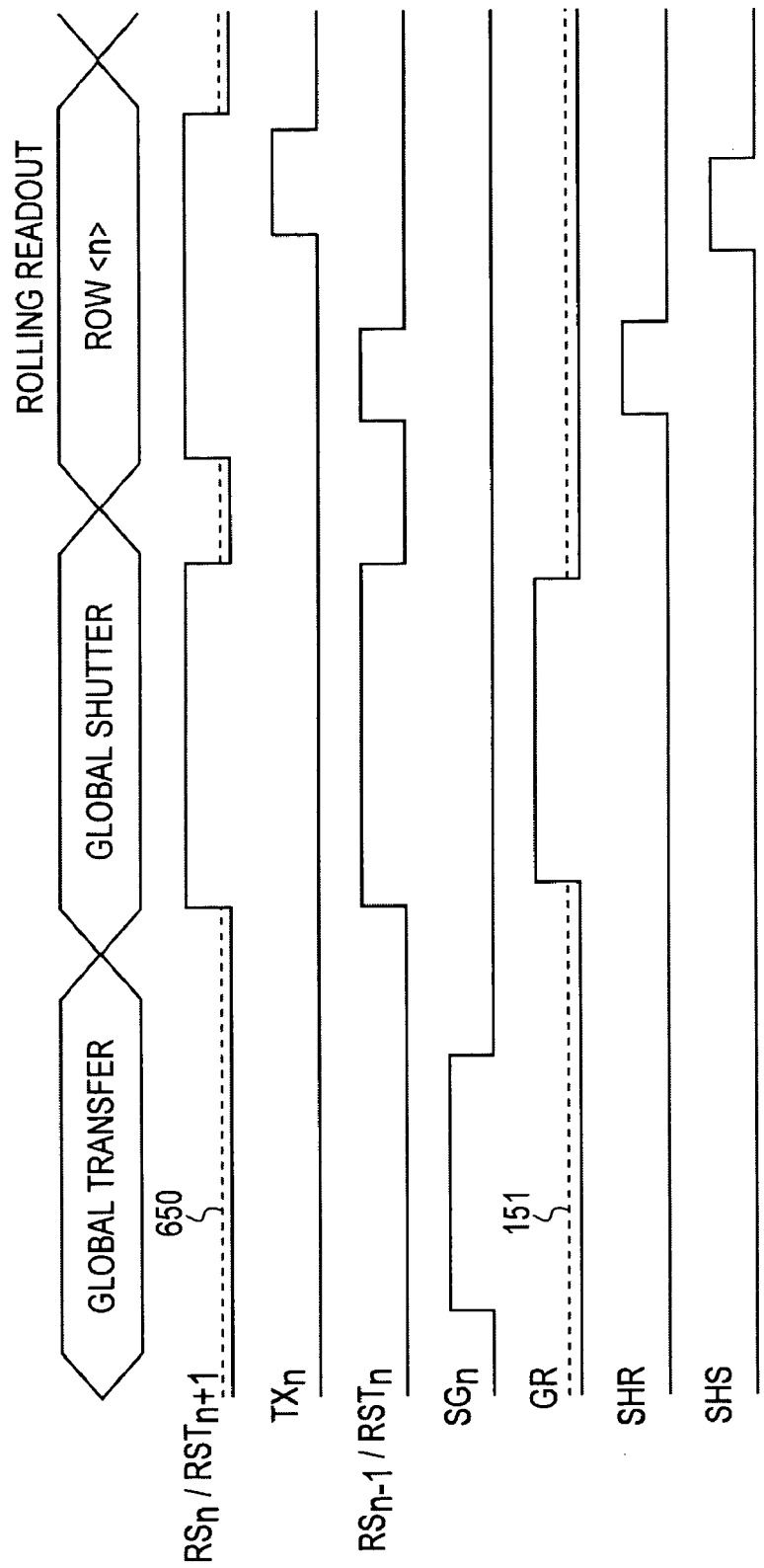
FIG. 7B is a timing diagram depicting an example of a method for operating a pixel array constructed according to an embodiment described herein.

FIG. 7B shows one possible timing diagram for the operation of a FIG. 7A pixel $600_n$. The timing in FIG. 7B differs from the timing in FIGS. 2B-6B because the row select signal RS and reset control signal RST are transferred on the same line.

Referring to FIG. 7B, a global transfer operation is performed on the pixel $600_n$ that has been integrating charge at the photosensor $21_n$. During the global transfer operation, the storage gate control signal $SG_n$ is activated to transfer the charge accumulated by the photosensor $21_n$ to the storage node $22_n$. A global shutter operation is performed during which the global reset control signal GR and row/reset control signal $RS_{n-1}/RST_n$ are activated allowing the global reset transistor $620n$ to transfer the row/reset control signal $RS_{n-1}/RST_n$ to the photosensor $21_n$ to reset the photosensor $21_n$ for a next integration period. As shown in FIG. 7B, row/reset control signal $RS_n/RST_{n+1}$ is also activated because all row/reset control signals in the pixel array are shuttered concurrently during the global shutter operation. When the global reset signal GR is inactivated at the end of the global shutter operation, the photosensor $21_n$ begins integration of a new charge that will be processed according to the method of FIG. 7B during the next global transfer operation.

While the photosensor $21_n$ integrates charge for future processing, a pixel array rolling readout operation is performed of the charge already transferred to the storage node $22_n$. The first step in reading out the pixel $600_n$ is activating the row/reset control signal $RS_n/RST_{n+1}$. Next, the row/reset control signal $RS_{n-1}/RST_n$ is activated to transfer a charge through the reset transistor $615_n$ to the floating diffusion region $FD_n$ and then to the source follower transistor $16_n$. A pixel reset signal $V_{rst}$ is output by the source follower transistor $16_n$ through row select transistor $617_n$ to column line 23 which routes the signal to sample and hold circuit 29, which samples and holds the pixel reset signal $V_{rst}$ when the reset sample and hold select signal SHR is activated. Next, the transfer control signal $TX_n$ is activated transferring the integrated charge from the storage node 22 to the floating diffusion region $FD_n$. This charge is output as the photo signal $V_{sig}$ from the output of the source follower transistor $16_n$ through row select transistor $617_n$ to column line 23. Column line 23 routes the signal to the sample and hold circuit 29, which samples and holds the photo signal $V_{sig}$ when the pixel signal sample and hold select signal SHS is activated.

In a modified embodiment, the row/reset control signal $RS_n/RST_{n+1}$ and global reset signal GR maintain a low positive voltage when inactive, shown by dashed lines 650, 151. By maintaining at least some positive voltage on the row/reset control line $627_n$ and global reset control line 24, photosensor $21_n$ is always able to bleed excess charge to the row/reset control line $627_n$ to provide an anti-blooming capability. The row/reset control signal $RS_n/RST_{n+1}$ and global reset signal GR maintain a minimum positive voltage higher than that of the photosensor 21.

Combinations of the various embodiments described herein are also possible. For example, the global reset transistor 420 of FIG. 5A with a first terminal and gate coupled to the global reset control line 24 can be combined with the row/reset control line 627 of FIG. 7A. In addition, global reset transistor 420 of FIG. 5A with a first terminal and gate coupled to the global reset control line 24 can be used with the embodiment shown in FIG. 2A. Furthermore, it is to be understood that all pixel arrays containing embodiments described herein can read out from top-to-bottom or from bottom-to-top.

Figure 8:
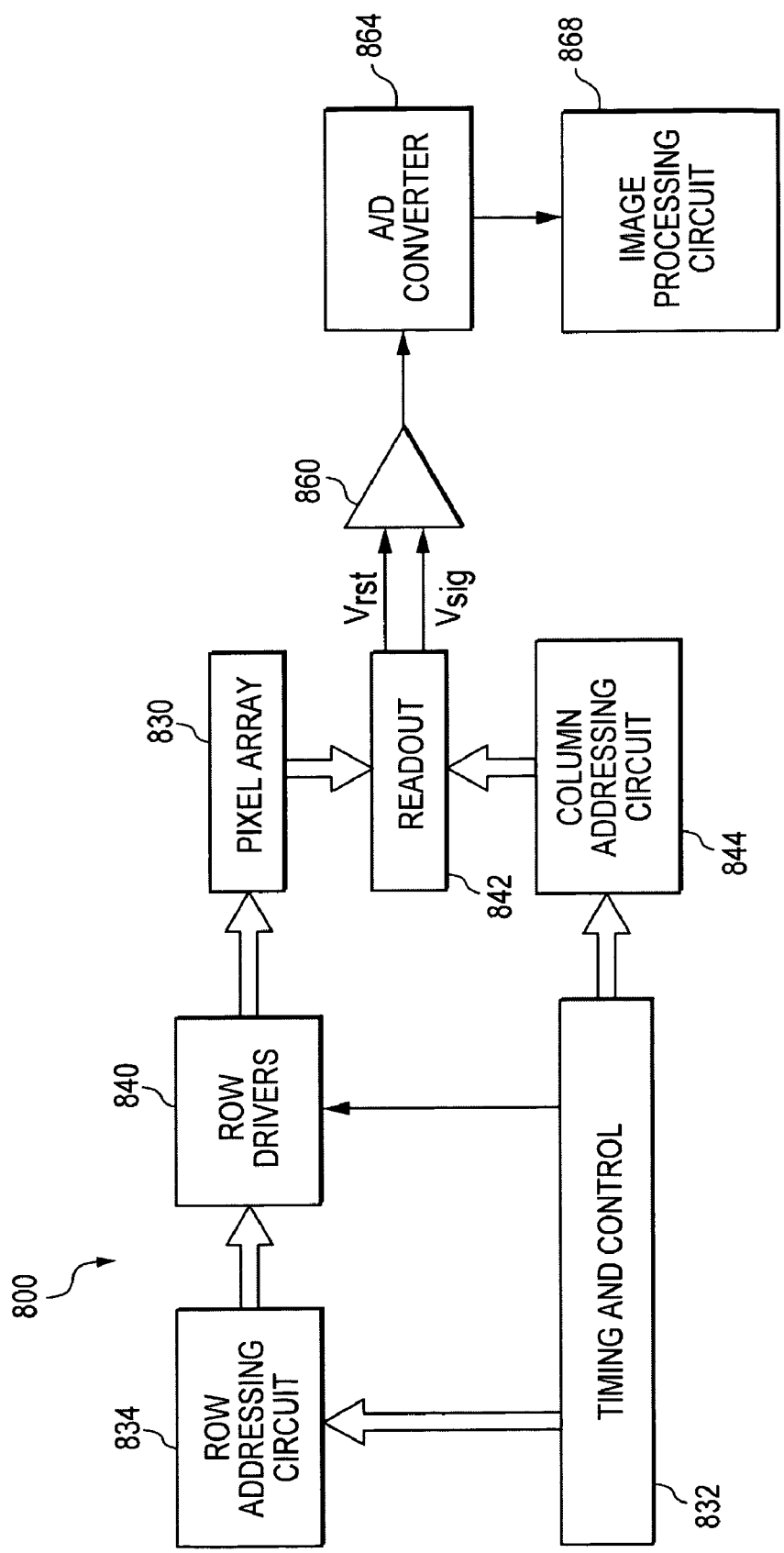
FIG. 8 is a block diagram of an imaging device according to an embodiment described herein.

FIG. 8 illustrates a block diagram example of a CMOS imager 800 having a pixel array 830 constructed in accordance with any of the embodiments and modified embodiments described above. Pixel array 830 comprises a plurality of pixels arranged in a predetermined number of columns and rows. The pixels of each row in array 830 are operated by row select lines, and the pixels of each column are selectively output by respective column select lines. A plurality of row and column lines are provided for the entire array 830. The row lines are selectively activated by a row driver 840 in response to row address circuit 834. The column select lines are selectively activated by a column addressing circuit 844. Thus, a row and column address is provided for each pixel. The pixel signals $V_{rst}$, $V_{sig}$ read out from each pixel are subtracted in differential amplifier 860 and are converted to digital signals by analog-to-digital converter 864 that supplies the digital signal to an image processing circuit that processes each pixel signal and forms an image that can be displayed, stored, or output.

Figure 9:
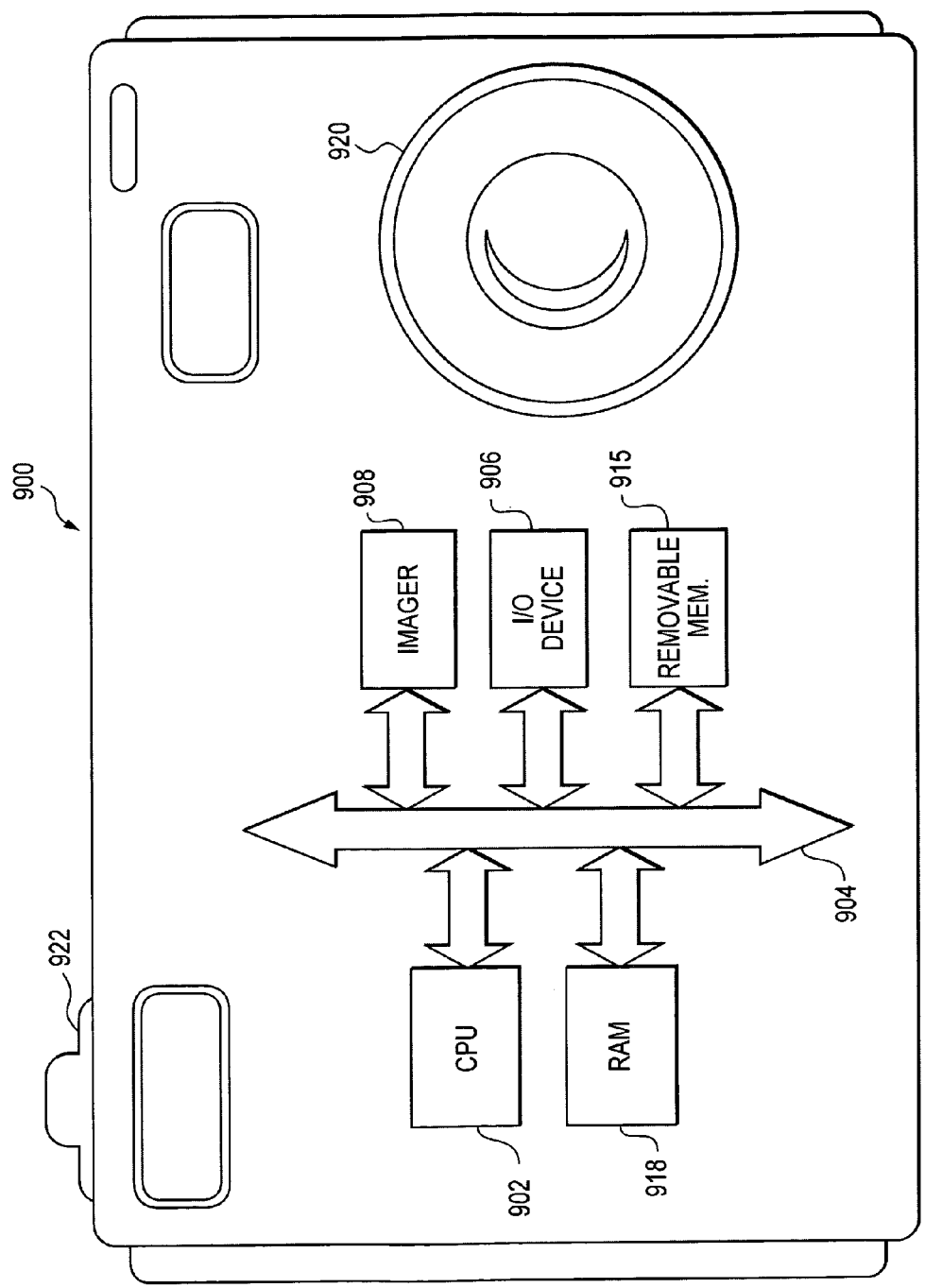
FIG. 9 is a block diagram of a processor system according to an embodiment described herein.

FIG. 9 shows a typical system 900 modified to include an imager 800 constructed and operated in accordance with an embodiment. The system 900 is a system having digital circuits that could include imaging devices. Without being limiting, such a system could include a computer system, camera system, scanner, machine vision, vehicle navigation, video phone, surveillance system, auto focus system, star tracker system, motion detection system, image stabilization system, or other image acquisition system.

System 900, for example a digital still or video camera system, generally comprises a central processing unit (CPU) 902, such as a control circuit or microprocessor for conducting camera functions, that communicates with one or more input/output (I/O) devices 906 over a bus 904. Imaging device 800 also communicates with the CPU 902 over the bus 904. The system 900 also includes random access memory (RAM) 910, and can include removable memory 915, such as flash memory, which also communicates with the CPU 902 over the bus 904. The imaging device 800 may be combined with the CPU processor with or without memory storage on a single integrated circuit or on a different chip than the CPU processor. In a camera system, a lens 920 is used to focus light onto the pixel array 830 of the imaging device 800 when a shutter release button 922 is pressed.

The above description and drawings are only to be considered illustrative of specific embodiments, which achieve the features and advantages described herein. Modification and substitutions to specific structures can be made. Accordingly, the invention is not to be considered as being limited by the foregoing description and drawings, but is only limited by the scope of the appended claims.

What is claimed as new and desired to be protected by Letters Patent of the United States is:

1. An imaging device, comprising:
   a pixel array having a plurality of pixels arranged in rows and columns, at least one pixel of the array comprising:
   a photosensor;
   a first reset transistor operable to reset the photosensor, wherein the first reset transistor has a first source-drain terminal, a second source-drain terminal, and a gate terminal and wherein the first source-drain terminal of the first reset transistor is coupled to the photosensor;
   a global reset line, wherein the gate terminal and the second source-drain terminal of the first reset transistor are coupled to the global reset line;
   a first storage node including a floating diffusion region operable to store charges generated by the photosensor;
   a second storage node operable to store the charges generated by the photosensor;
   a first transfer transistor operable to transfer the charges generated by the photosensor from the photosensor to the second storage node;
   a second transfer transistor operable to transfer the charges generated by the photosensor from the second storage node to the floating diffusion region of the first storage node; and
   a second reset transistor operable to reset the floating diffusion region of the first storage node, wherein the second reset transistor has a first source-drain terminal, a second source-drain terminal, and a gate terminal, wherein the first source-drain terminal of the second reset transistor is coupled to the floating diffusion region of the first storage node, wherein the gate terminal and the second source-drain terminal of the second reset transistor are coupled to a column line.

2. The imaging device of claim 1, wherein the column line that the gate terminal and the second source-drain terminal of the second reset transistor are coupled to comprises a column output line.

3. The imaging device of claim 2 further comprising:
   a latch up circuit for switchably placing an array voltage on the column output line.

4. The imaging device of claim 3 further comprising:
   a capacitor having a first terminal coupled to the floating diffusion region and having a second terminal operable to receive the array voltage;
   a source-follower transistor having a gate terminal coupled to the floating diffusion region of the first storage node, having a first source-drain terminal operable to receive the array voltage, and having a second source-drain terminal; and
   a row-select transistor having a gate terminal operable to receive row select signals from a row select line, having a first source-drain terminal coupled to the second source-drain terminal of the source-follow transistor, and having a second source-drain terminal coupled to the column line to which the gate terminal and the second source-drain terminal of the second reset transistor are coupled.

5. An imaging pixel comprising:
   a photosensor;
   a first reset transistor, wherein the first reset transistor has a first source-drain terminal, a second source-drain terminal, and a gate terminal;
   an output line, wherein at least one of the terminals of the first reset transistor is coupled to the output line, wherein the gate terminal and the first source-drain terminal of the first reset transistor are coupled to the output line;
   a reset line; and
   a second reset transistor having first and second source-drain terminals and a gate terminal, wherein the first source-drain terminal and the gate terminal of the second reset transistor are coupled to the reset line.

6. The imaging pixel defined in claim 5 further comprising:
   a first storage node including a floating diffusion region for storing charges generated by the photosensor; and
   a second storage node for storing the charged generated by the photosensor.

7. The imaging pixel defined in claim 6 wherein the second source-drain terminal of the second reset transistor is coupled to the second storage node and wherein the second source-drain terminal of the first reset transistor is coupled to the floating diffusion region.

8. The imaging pixel defined in claim 7 further comprising:
   a first transfer transistor coupled between the photosensor and the second storage node; and
   a second transfer transistor coupled between the second storage node and the first storage node.

* * * * *